Jan. 7, 1969     E. S. LEWIS, JR     3,420,649
METHOD OF DRAWING GLASS ARTICLES
Filed June 16, 1967
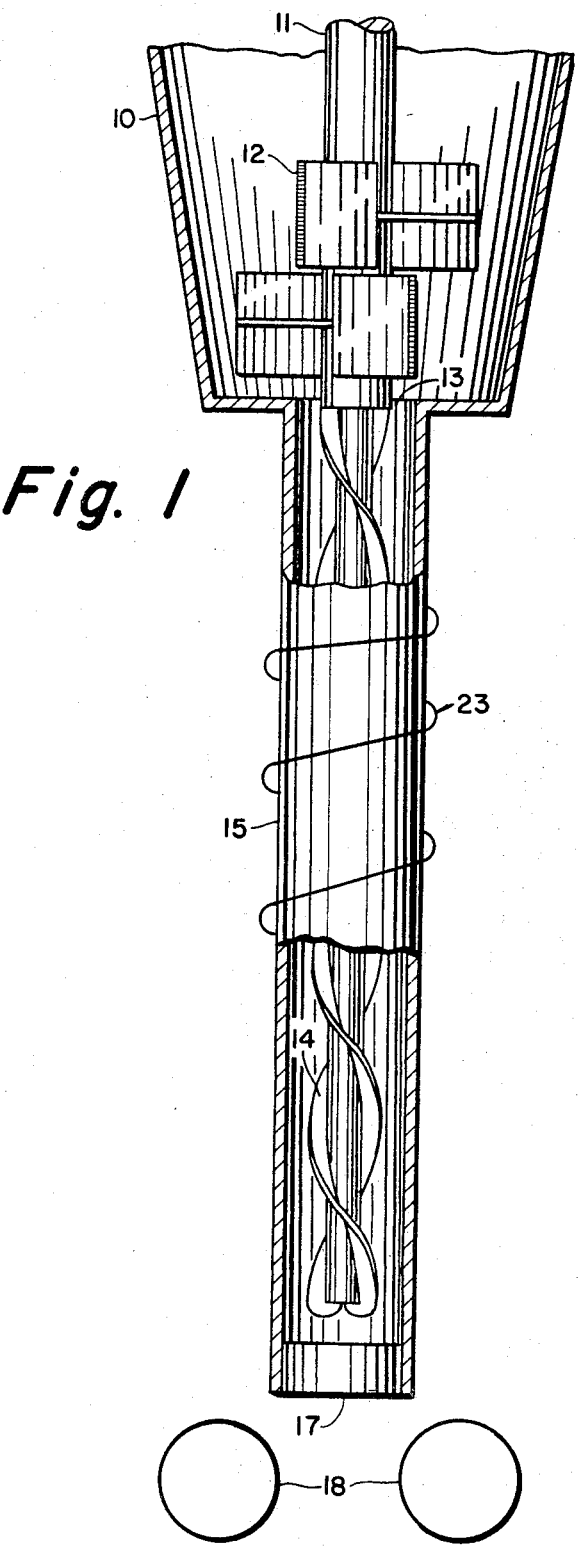
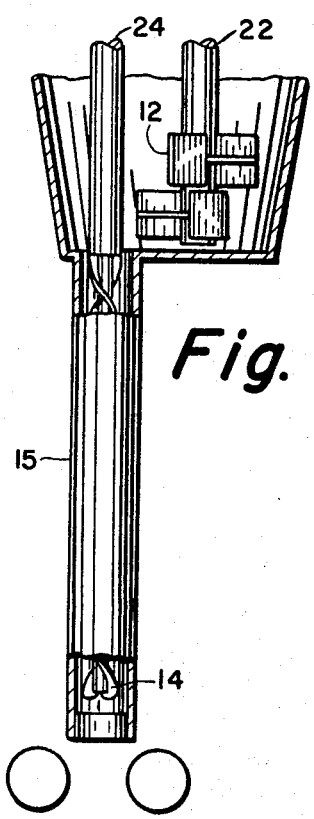
*Fig. 1*
*Fig. 2*
INVENTOR.
EDMOND S. LEWIS, Jr.
BY
Gerhard K. Adam
ATTORNEY United States Patent Office 3,420,649
Patented Jan. 7, 1969

3,420,649
METHOD OF DRAWING GLASS ARTICLES
Edmond S. Lewis, Jr., Monterey, N.Y., assignor to Corning Glass Works, Corning, N.Y., a corporation of New York
Continuation-in-part of application Ser. No. 334,459 Dec. 30, 1963. This application June 16, 1967, Ser. No. 646,694
U.S. Cl. 65—66                                3 Claims
Int. Cl. C03b 17/04; C03c 3/10

ABSTRACT OF THE DISCLOSURE

An improved method of forming special glass materials and in particular a method of forming thixotropic glasses into a cane or tubing by drawing the glass directly from the orifice of a glass melting tank.

---

This application is a continuation-in-part of my copending application, Ser. No. 334,459 filed on Dec. 30, 1963, now abandoned.

Heretofore the methods of fabricating glass into elongated articles have been based on the knowledge that a homogeneous glass usually exhibits the properties of a normal liquid. The conventional techniques for drawing cane, tubing, and sheet are described by J. R. Hutchins et al. in Kirk-Othmer, Encyclopedia of Chemical Technology, 2nd edition, volume 10, page 564. Accordingly in the glass forming apparatus, the glass being in a fluid state, is passed through the orifice of a delivery tube which imparts the final cross-section of the article. Prior to emerging from the tube the visosity of the glass must be in the working range which is from about $10^4$ to $10^{7.6}$ poises. This is accomplished by providing a temperature gradient along the length of the delivery tube so that the emerging glass is cooled to a sufficiently viscous state at which it can be drawn away from the tube by rollers or other means.

Sometimes it is desirable to melt certain nonhomogeneous glasses, that is, those containing particles of a modifying agent such as an insoluble oxide, e.g., tin oxide, in the undissolved state. The presence of such undissolved particles changes the viscosity characteristics of the glass composition and makes it very difficult to shape the glass by the usual methods. Conventional techniques to draw these glasses containing insoluble oxides by gradually cooling the glass to obtain the viscosity within the working range have been impractical, since the special glasses become sluggish and exhibit resistance to flow which is typical of thixotropic materials. Attempts to reduce the apparent viscosity of the glass by increasing the temperature in the delivery tube have also not been successful. When heat is applied along the entire length of the tube to reduce the apparent viscosity the glass emerging from the orifice becomes too fluid to be handled by the usual drawing apparatus.

It is therefore an object of the present invention to provide a method of forming glasses containing insoluble oxides into elongated articles.

In accordance with the present invention I have discovered an improved method of forming an elongated article from a molten glass containing particles of insoluble oxides which render the glass thixotropic comprising the steps of passing the molten glass into an elongated delivery tube having an orifice at the lower end thereof, agitating the glass within the tube to reduce the viscosity of the glass sufficiently to permit the glass to flow through the orifice, discharging the glass from the orifice while the viscosity is reduced and then finally drawing the glass of reduced viscosity into the elongated article.

The term thixotropic as used herein is defined broadly as a reversible gel-sol transformation under isothermal shearing stress followed by rest. Thus the viscosity of a thixotropic material can be reduced by agitation.

As an illustration, a thixotropic glass of the present invention consists essentially on the oxide basis as calculated from the batch of the following compositions:

|  | Weight percent |
|---|---|
| PbO | 52.9–59.25 |
| $SiO_2$ | 16.8–26.4 |
| $SnO_2$ | 8.4–21.0 |
| $Sb_2O_3$ | 0–10.3 |

This is a lead silicate glass containing undissoved tin oxide which is useful in making resistor cane. The conducting ingredient is tin oxide which is partially dissolved in the glassy phase at high temperatures. The fact that the tin oxide did not completely dissolve causes the mixture of insoluble oxide crystals and the glassy phase to take on thixotropic properties, i.e. the viscosity of molten glass is dependent on the degree of agitation. It is theorized that as cane is drawn through the special apparatus of the present invention the material cooled down sufficiently whereby the tin oxide in solution crystallized out onto the solid particulate tin oxide forming an interlocking tin oxide structure supported by the lead glass matrix. The addition of antimony oxide to the composition forms a defect structure in the tin oxide crystallites which appear to enhance or allow electrical conduction.

The invention is more clearly understood from the following description taken in conjunction with the accompanying drawing in which:

FIGURE 1 is a diagrammatic sectional view of an apparatus used in the method of the present invention.

FIGURE 2 is a diagrammatic sectional view of a modified construction of the apparatus of FIGURE 1.

In FIGURE 1, there is provided a mixing chamber 10 for the mixing and melting of refractory material. The batch material may be placed in powder form in the mixing chamber and heated to melting temperature. The mixing chamber is provided with an upper batch stirrer 12 attached to a rotatable mandrel 11 for purposes of stirring the batch composition while it is being melted. When the batch is sufficiently melted and blended, the molten material is permitted to flow through an opening 13 into a delivery tube 15. The flow may be started by removal of a stopper or plug 17 at the lower end of the delivery tube. A variable heating means 23 provides a temperature gradient along the length of the delivery tube. As the molten material passes through the delivery tube, it is gradually cooled as a result of the temperature gradient and is kept in a constant state of agitation by a rotating spiral stirrer 14 attached to the lower end of the batch stirrer and extending substantially the length of the delivery tube. As the formed rod passes out of the lower end of the delivery tube, it is engaged by rollers 18 which aid in the continuous drawing of the glass away from the delivery tube.

In the modified form illustrated in FIGURE 2, the upper stirrer 12 and lower stirrer 14 have been separated and provide with independent mandrels 22 and 24, respectively, to permit independent control of the stirrers.

The apparatus described herein may be fabricated from any of the usual refractory materials suitable for the handling of molten glass. Many materials, particularly metals, exhibit a tendency to seize at high temperatures. This difficulty may be minimized through the use of apparatus made of platinum and platinum-rhodium alloy. In a preferred embodiment, the moving members of the apparatus are made of one of these materials, and the non-moving members of the apparatus are made of the other. In this manner, the possibility of the stirrers seizing or binding to the mixing chamber or delivery tube is minimized.

The stirrer used in the mixing chamber to blend the batch materials may be of any suitable design. A paddle-type stirrer has been shown in the accompanying drawing. However, with regard to the lower stirrer, I have found that a spiral or helical type of stirrer, such as the type shown in the accompanying drawing, offers particular advantages in the process of the present invention. A stirrer of this design offers the advantage of not only agitating the thixotropic materials during its passage through the delivery tube but also offers a directional force which may be utilized to retard or impel the flow of glass through the delivery tube by varying the speed and/or the direction of rotation of the stirrer.

My invention is further illustrated by the following examples of glass composition calculated from the batch containing insoluble oxides in percent by weight on the oxide basis which were drawn into cane using the apparatus described hereinabove.

THIXOTROPIC GLASS COMPOSITIONS

|  | 1 | 2 | 3 | 4 | 5 | 6 |
|---|---|---|---|---|---|---|
| PbO | 59.25 | 59.25 | 59.25 | 65.0 | 67.5 | 56.4 |
| SiO$_2$ | 19.75 | 19.75 | 19.75 | 24.0 | 24.0 | 16.8 |
| SnO$_2$ | 14.00 | 16.80 | 18.00 | 10.9 | 8.4 | 18.8 |
| Sb$_2$O$_3$ | 7.00 | 4.20 | 3.00 |  |  |  |
| B$_2$O$_3$ |  |  |  |  |  | 8.1 |

|  | 7 | 8 | 9 | 10 | 11 | 12 |
|---|---|---|---|---|---|---|
| PbO | 52.9 | 52.9 | 59.25 | 52.9 | 58.96 | 58.66 |
| SiO$_2$ | 26.4 | 26.4 | 19.75 | 26.4 | 19.65 | 19.55 |
| SnO$_2$ | 15.8 | 17.8 | 21.00 | 20.7 | 16.72 | 16.63 |
| Sb$_2$O$_3$ | 4.9 | 3.0 |  |  | 4.18 | 4.16 |
| Li$_2$O |  |  |  |  | .50 |  |
| F |  |  |  |  |  | .99 |

|  | 13 | 14 | 15 | 16 | 17 | 18 |
|---|---|---|---|---|---|---|
| PbO | 59.25 | 56.11 | 59.25 | 59.25 | 59.25 | 58.33 |
| SiO$_2$ | 19.75 | 18.70 | 19.75 | 19.75 | 19.75 | 19.45 |
| SnO$_2$ | 10.70 | 15.21 | 16.01 | 16.01 | 16.93 | 16.67 |
| Sb$_2$O$_3$ | 10.30 | 9.98 | 5.34 | 5.00 | 5.29 | 5.56 |

|  | 19 | 20 | 21 | 22 |
|---|---|---|---|---|
| PbO | 54.85 | 55.03 | 54.38 | 54.19 |
| SiO$_2$ | 23.88 | 23.96 | 23.67 | 23.59 |
| SnO$_2$ | 15.95 | 16.01 | 16.72 | 16.67 |
| Sb$_2$O$_3$ | 5.32 | 5.00 | 5.23 | 5.56 |

It will be appreciated that the invention is not limited to the specific details shown in the examples and illustrations, and that various modifications may be made within the ordinary skill in the art without departing from the spirit and scope of the invention.

I claim:

1. In a method of forming an elongated article from a thixotropic material consisting essentially of a molten glass, containing in an undissolved state particles of insoluble oxides which render the glass thixotropic, the improvement comprising
    (a) passing the molten glass into an elongated delivery tube having an orifice at the lower end thereof,
    (b) agitating said glass within said tube to reduce the viscosity of the glass sufficiently to permit the glass to flow through said orifice,
    (c) discharging said glass from said orifice while the viscosity is reduced and,
    (d) drawing said glass of reduced viscosity into said elongated article.

2. The method of claim 1, which includes agitating the glass with a mechanical stirrer located within said tube at least in the vicinity of said orifice.

3. The method of claim 1, wherein said glass consists essentially on the oxide basis as calculated from the batch of the following:

|  | Weight percent |
|---|---|
| PbO | 52.9–59.25 |
| SiO$_2$ | 16.8–26.4 |
| SnO$_2$ | 8.4–21.0 |
| Sb$_2$O$_3$ | 0–10.3 |

References Cited

UNITED STATES PATENTS

| 1,778,775 | 10/1930 | Soubier | 65—325 |
| 1,853,843 | 4/1932 | Bates et al. | 65—129 |
| 2,569,459 | 10/1951 | De Voe | 65—179 XR |
| 2,871,000 | 1/1959 | Dowling. |  |
| 3,174,729 | 3/1965 | Cala | 65—180 XR |
| 3,209,641 | 10/1965 | Upton | 65—179 XR |
| 3,219,426 | 11/1965 | Steer | 65—374 XR |
| 3,244,493 | 4/1966 | Cala | 65—179 XR |

DONALL H. SYLVESTER, *Primary Examiner.*

FRANK W. MIGA, *Assistant Examiner.*

U.S. Cl. X.R.

65—180, 86, 374, 325, 129; 106—53